No. 872,758. PATENTED DEC. 3, 1907.
D. R. SCHOLES.
TRANSMISSION TOWER.
APPLICATION FILED APR. 13, 1907.

3 SHEETS—SHEET 3.

Witnesses: Inventor
Daniel R. Scholes
By his Attorney

UNITED STATES PATENT OFFICE.

DANIEL R. SCHOLES, OF CHICAGO, ILLINOIS, ASSIGNOR TO AERMOTOR COMPANY, OF CHICAGO, ILLINOIS, A CORPORATION OF ILLINOIS.

TRANSMISSION-TOWER.

No. 872,758.     Specification of Letters Patent.     Patented Dec. 3, 1907.

Application filed April 13, 1907. Serial No. 367,941.

*To all whom it may concern:*

Be it known that I, DANIEL R. SCHOLES, a citizen of the United States, residing at Chicago, in the county of Cook and State of Illinois, have invented certain new and useful Improvements in Transmission-Towers, of which the following is a specification.

The invention relates to structural-iron towers which are adapted for supporting electric transmission wires or cables, but which may be used for other purposes.

One object of the invention is to improve the construction of such towers with a view to better adapting them for supporting electric transmission wires and for better resisting the stresses that are peculiar to such use, and another object of the invention is to improve the construction of the rigging by which the transmission wires are carried with a view to obtaining a maximum of strength and rigidity from the material used.

The invention consists in the features of novelty that are hereinafter described.

Figure 1:
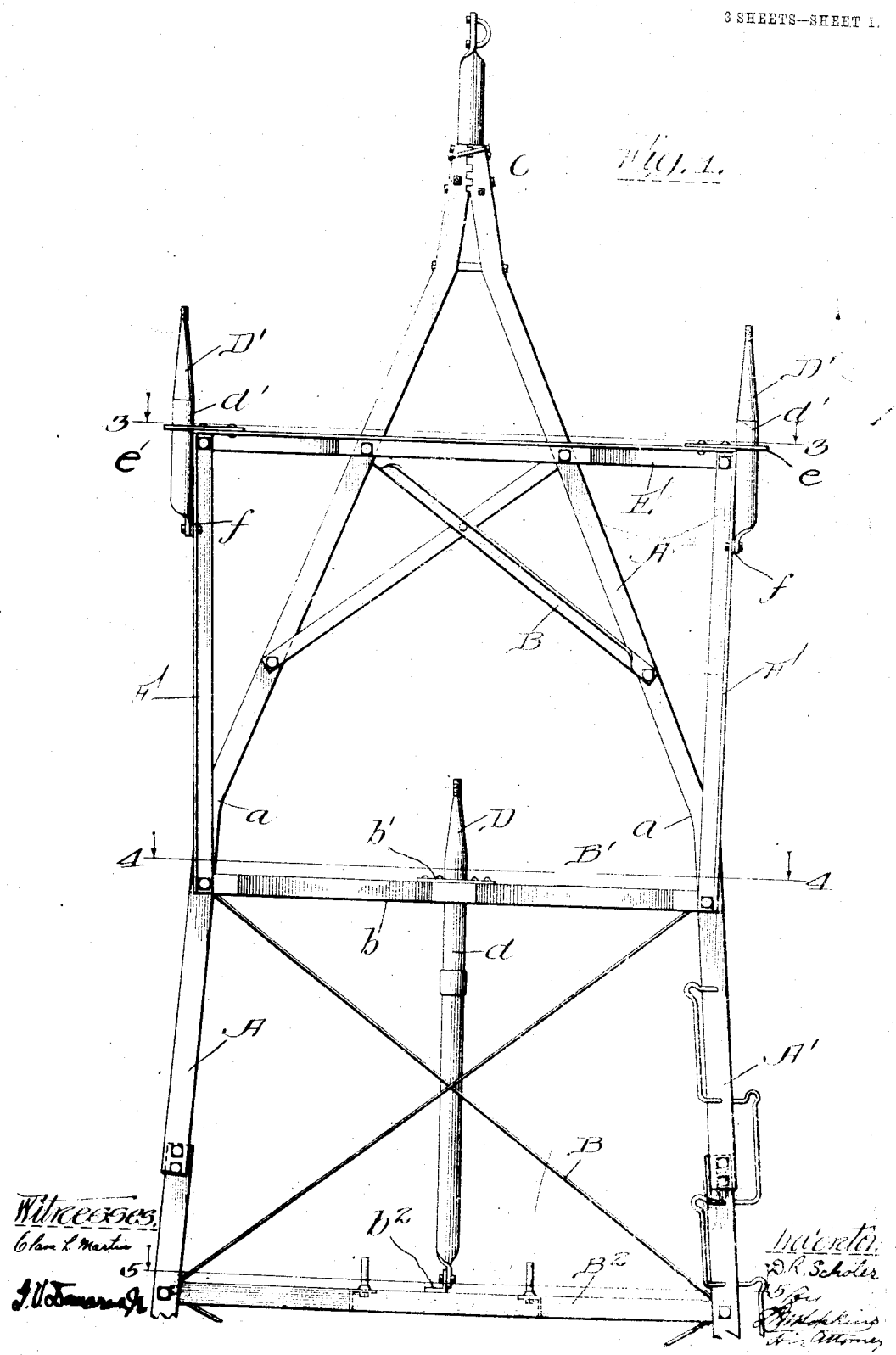
Figure 2:
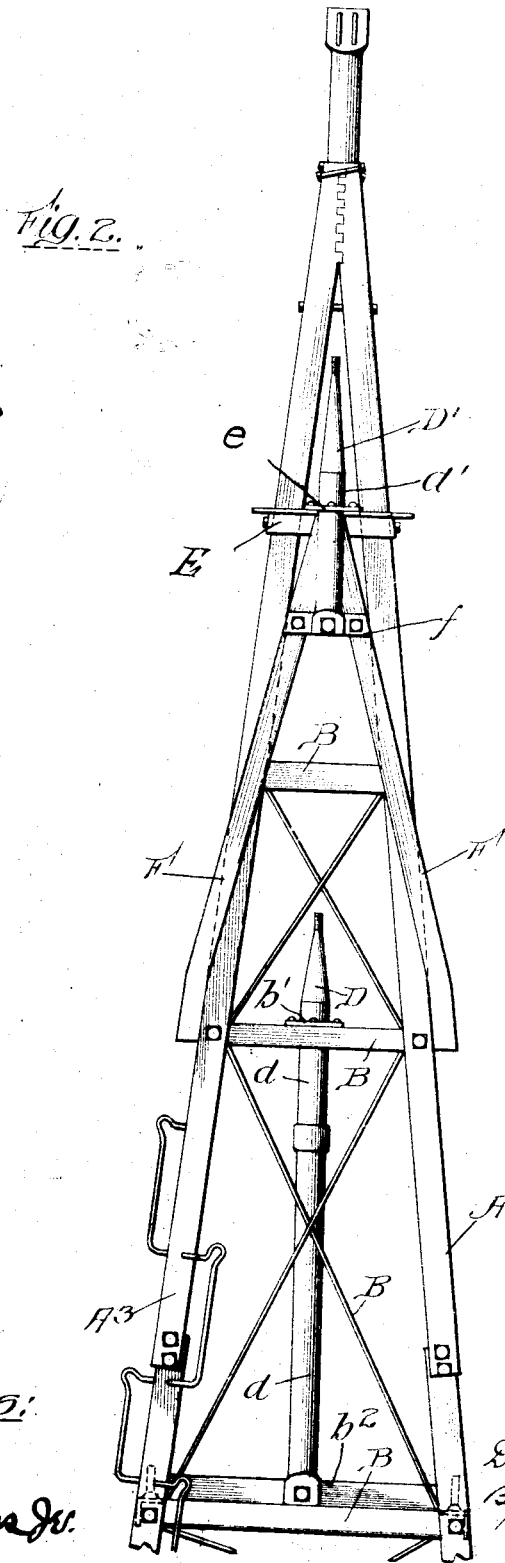
Figure 3:
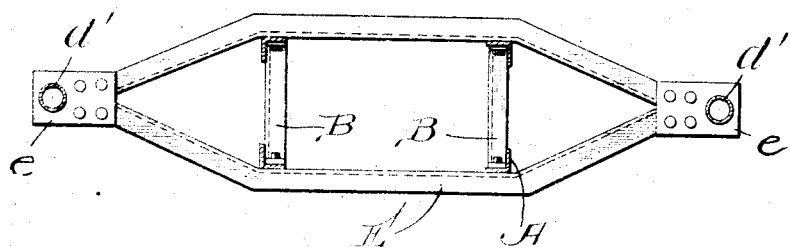
Figure 4:
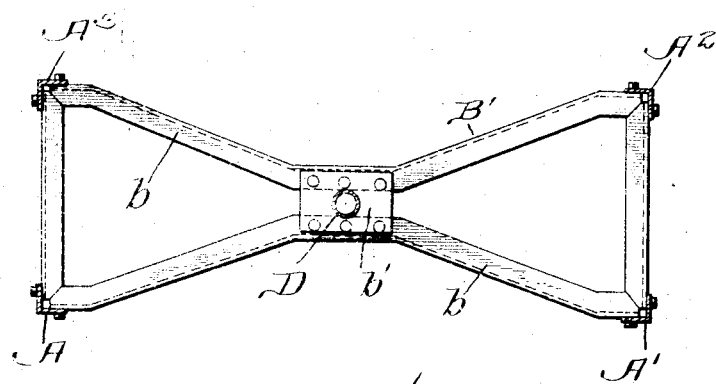
Figure 5:
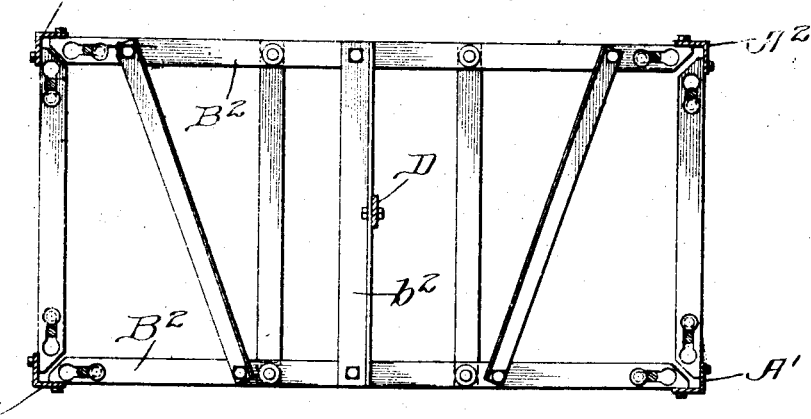

In the accompanying drawings which are made a part of this specification; Figures 1 and 2 are respectively, a front and a side elevation of the upper portion of a tower embodying the invention. Figs. 3, 4 and 5 are horizontal sections thereof on the lines 3—3, 4—4, and 5—5— respectively. Fig. 1 looking downward.

Throughout this specification the term "longitudinal" is used to indicate the direction in which the tower is viewed in Fig. 1, and similar terms indicating direction or location are referable thereto, unless otherwise indicated or apparent.

The tower proper comprises four corner posts, A, A', A², A³ preferably made of angle iron, suitable braces, B, etc. such as are customarily used, or of any other desired construction and arrangement, connecting them at intermediate points, and suitable means for connecting the upper ends of all the posts together, as shown at C.

At the base of the tower the posts occupy the four corners of an imaginary square, whence they converge upward upon such lines that they occupy the four corners of a parallelogram elongated laterally, more or less, according to the altitude at which they are considered. This is due to variations in the angles of their convergence, considered in different directions. Considered transversely (Fig. 2) the four posts lie wholly in two transverse planes which converge from bottom to top at an angle of about fifteen degrees to each other. Considered longitudinally the four posts lie partly in two longitudinal planes which converge upward at an angle of about six degrees and partly in two longitudinal planes which converge upward at an angle of about forty five degrees to each other, thus forming a peak at the top of the tower. To accomplish this, all of the posts are bent transversely at $a$, this being the point at which the so-called peak begins.

The wide lateral spread of the base of the peak thus produced affords sufficient clearance through the tower longitudinally for the passage of one of the transmission wires, the insulator pin for which is shown at D.

It would not be possible to carry this wire through the tower if the posts converged from bottom to top in two longitudinal planes as shown in Fig. 2, because it is necessary for the transmission wire to be placed at a safe distance from any part of the tower structure, and this distance would not be afforded by the arrangement shown in Fig. 2.

The tower braces B' used at the level of the pin D, (and elsewhere, if desired) are so shaped and arranged that they not only perform the functions of compression members for bracing the tower but, in addition, form a cross arm which affords the chief lateral support for the pin. This combined brace and cross arm is made of two angle irons, $b$ bent inward, toward each other, at their central portions and united by a plate $b'$ in substantially the form of the letter X. The plate has an opening for the passage of the tubular socket $d$ in which the pin D fits and the four diverging branches of the brace are united at their ends to the four posts of the tower, so that the pin is braced in all horizontal directions. The socket for the pin passes downward through the plate $b'$ and its lower end is secured to and supported by the tower-braces B² through the medium of a cross arm $b²$.

To the upper portion of the peak of the tower is secured a horizontal cross-arm E which carries at each end an insulator pin D' for the attachment of a transmission wire. The cross-arm is of truss-form and is made of two angle irons the intermediate portions of which are parallel and secured to the outside of the tower posts and the outer portions of which converge and are secured together by plates e.

Each of the outer ends of the cross-arm is braced by a pair of braces F, the upper ends of which are secured to the cross-arm whence they diverge downward, and have their lower ends secured to the posts of the tower. The braces of each pair lie in a substantially vertical longitudinal plane, and substantially in the direct line of the stresses produced by the transmission wire, and this is made possible by the wide lateral divergence of the posts of the tower at the base of the peak. This wide lateral divergence of the sides of the peak also results in shortening the projecting portions of the cross arms, or, in other words, bringing the points of connection between the cross arm and the tower closer to the ends of the cross-arm. This, in effect, shortens the arm or lever through which the stresses of the transmission wire are transmitted to the tower and at the same time gives a wider base of attachment between the cross-arm and the tower. These are all factors in increasing the strength and rigidity of the peak of the tower and of the rigging which it carries.

Each of the insulator pins D' occupies a tubular socket d' which passes through an opening in the plate e and has its lower end attached to a cross plate f attached to the braces F.

What I claim as new and desire to secure by Letters Patent, is:

1. A tower having four posts converging at their upper portions to form a peak, braces in the form of the letter X connecting the posts at the base of the peak and means supported by the braces for carrying a transmission wire.

2. A tower having four posts converging at their upper portions to form a peak, the angle of convergence of said posts at the peak being greater longitudinally than transversely, braces connecting the posts at the base of the peak, and means carried by the braces for supporting the transmission wire.

3. A tower having four posts bent near their upper ends so that their upper and lower portions form angles with each other and so that their upper portions converge to form a peak, a cross arm secured to the peak and having projecting ends and a pair of braces for each end of the cross arm, the braces of each pair having their upper ends secured to the cross arm whence they diverge downward and have their lower ends secured to the tower.

4. A tower having four posts bent near their upper ends so that their upper and lower portions form angles with each other, and the upper portions converging to form a peak, a cross arm secured to the peak, said cross arm being of truss formation and having parallel intermediate portions secured to the peak and converging outer portions projecting beyond the peak and a pair of braces for each projecting end and cross arm, the braces of each pair having their upper ends secured to the cross arm whence they diverge downward and have their lower ends secured to the tower.

5. A tower having four posts, the upper portions of which converge to form a peak, braces connecting said posts, a cross arm having its intermediate portion secured to the peak and having outer portions projecting beyond the peak and a pair of braces for each projecting end of the cross arm, the braces of each pair lying in a substantially vertical plane, and having their upper ends secured to the cross arm whence they diverge downward and have their lower ends secured to the tower posts.

6. A tower having four posts converging from bottom to top in two transverse planes and also converging at their upper portions in two longitudinal planes, the angle of convergence in one direction being greater than the angle of convergence in the other direction, a cross arm of truss formation having its intermediate portion secured to the converging posts and having converging portions projecting beyond said converging posts and a pair of braces for each projecting end of the cross arm, the braces of each pair having their upper ends secured to the cross arm whence they diverge downward and have their lower ends secured to the tower.

7. A tower having four corner posts and a combined brace and cross-arm made of two braces having their central portions bent inward, toward each other, and means for connecting their central portions together, their diverging branches being secured to the tower posts.

8. A tower having four corner posts, and a combined brace and cross-arm made of two braces having their central portions bent inward, toward each other, and a plate secured to and connecting their central portions, their diverging branches being secured to the tower posts.

9. A tower having four corner posts and a combined brace and cross-arm made of two braces having their central portions bent inward, toward each other, and a plate secured to and connecting their central portions, their diverging branches being secured to the tower-posts, the plate having an opening through it for the purpose described.

DANIEL R. SCHOLES.

Witnesses:
L. C. WALKER,
J. FLANIGAN.